United States Patent
Colin et al.

(10) Patent No.: US 10,710,156 B2
(45) Date of Patent: Jul. 14, 2020

(54) PROCESS FOR ADDITIVE MANUFACTURING OF PARTS BY MELTING OR SINTERING PARTICLES OF POWDER(S) USING A HIGH-ENERGY BEAM WITH POWDERS ADAPTED TO THE TARGETED PROCESS/MATERIAL PAIR

(71) Applicants: SAFRAN AIRCRAFT ENGINES, Paris (FR); EUROPEAN AERONAUTIC DEFENCE AND SPACE COMPANY EADS FRANCE, Paris (FR); AIRBUS HELICOPTERS, Marignane (FR)

(72) Inventors: Christophe Colin, Evry (FR); Laetitia Kirschner, Paris (FR)

(73) Assignees: SAFRAN AIRCRAFT ENGINES, Paris (FR); EUROPEAN AERONAUTIC DEFENCE AND SPACE COMPANY EADS FRANCE, Paris (FR); AIRBUS HELICOPTERS, Marignane (FR)

(*) Notice: Subject to any disclaimer, the term of this patent is extended or adjusted under 35 U.S.C. 154(b) by 857 days.

(21) Appl. No.: 14/902,699

(22) PCT Filed: Jun. 30, 2014

(86) PCT No.: PCT/FR2014/051675
§ 371 (c)(1),
(2) Date: Jan. 4, 2016

(87) PCT Pub. No.: WO2015/001241
PCT Pub. Date: Jan. 8, 2015

(65) Prior Publication Data
US 2016/0175929 A1    Jun. 23, 2016

(30) Foreign Application Priority Data
Jul. 4, 2013   (FR) ..................... 13 01591

(51) Int. Cl.
*B22F 1/00*   (2006.01)
*B22F 3/105*  (2006.01)
(Continued)

(52) U.S. Cl.
CPC .......... *B22F 1/0048* (2013.01); *B22F 1/0014* (2013.01); *B22F 3/1055* (2013.01);
(Continued)

(58) Field of Classification Search
None
See application file for complete search history.

(56) References Cited

U.S. PATENT DOCUMENTS

| 2004/0009089 A1* | 1/2004 | Liu ................ B22F 1/0003 419/38 |
| 2004/0060682 A1* | 4/2004 | Newell ............ B22D 19/14 164/97 |

(Continued)

FOREIGN PATENT DOCUMENTS

| CN | 1524649 A  | 9/2004 |
| CN | 102574204 A | 7/2012 |

(Continued)

OTHER PUBLICATIONS

Office Action dated Apr. 3, 2018 in European Patent Application No. 14 790 118.5.
(Continued)

*Primary Examiner* — Colin W. Slifka
(74) *Attorney, Agent, or Firm* — Oblon, McClelland, Maier & Neustadt, L.L.P.

(57) ABSTRACT

A method of fabricating parts out of metallic, intermetallic, ceramic, ceramic matrix composite, or metal matrix composite material with discontinuous reinforcement, includes melting or sintering powder particles by means of a high-energy beam. The powder used is a single powder of
(Continued)

particles that present sphericity lying in the range 0.8 to 1.0 and of form factor lying in the range 1 to $\sqrt{2}$, each powder particle presenting substantially identical mean composition, and the grain size distribution of the particles of the powder is narrowed around the mean diameter value d50% in such a manner that: (d90%−d50%)/d50%≤0.66; and (d50%−d10%)/d50%≤0.33; with a "span": (d90%−d10%)/d50%≤1.00.

14 Claims, 5 Drawing Sheets

(51) Int. Cl.
| | |
|---|---|
| B23K 26/342 | (2014.01) |
| B28B 1/00 | (2006.01) |
| C04B 35/71 | (2006.01) |
| C22C 1/04 | (2006.01) |
| C04B 35/628 | (2006.01) |
| B22F 9/08 | (2006.01) |
| C22C 33/02 | (2006.01) |
| B22F 9/04 | (2006.01) |
| B33Y 10/00 | (2015.01) |
| B33Y 70/00 | (2020.01) |

(52) U.S. Cl.
CPC ............ *B23K 26/342* (2015.10); *B28B 1/001* (2013.01); *C04B 35/62839* (2013.01); *C04B 35/71* (2013.01); *C22C 1/0491* (2013.01); *B22F 1/0096* (2013.01); *B22F 9/04* (2013.01); *B22F 9/082* (2013.01); *B22F 2003/1056* (2013.01); *B22F 2009/041* (2013.01); *B33Y 10/00* (2014.12); *B33Y 70/00* (2014.12); *C04B 2235/5296* (2013.01); *C04B 2235/5463* (2013.01); *C04B 2235/5481* (2013.01); *C04B 2235/665* (2013.01); *C22C 33/0207* (2013.01); *C22C 33/0257* (2013.01); *Y02P 10/295* (2015.11)

(56) References Cited

U.S. PATENT DOCUMENTS

| | | |
|---|---|---|
| 2012/0237745 A1 | 9/2012 | Dierkes et al. |
| 2014/0140882 A1* | 5/2014 | Syassen .................. B22F 3/003 419/53 |

FOREIGN PATENT DOCUMENTS

| | | |
|---|---|---|
| CN | 102990063 A | 3/2013 |
| CN | 103 008 657 A | 4/2013 |
| JP | 4-158955 A | 6/1992 |
| JP | 2009-270130 A | 11/2009 |
| JP | 2010-99686 A | 5/2010 |
| RU | 2 021 881 C1 | 10/1994 |
| WO | WO 2011/149101 A1 | 12/2011 |

OTHER PUBLICATIONS

A.Simichi, et al., "Effect of SiC particles on the laser sintering of Al—7Si—0.3Mg alloy", Scripta Materialia, vol. 59, No. 2, XP022669061, Jul. 2008, pp. 199-202.

Lü, et al., "Chapter 5: Selective Laser Sintering", Laser-Induced Materials and Processes for Rapid Prototy, XP008150153, Jan. 2001, pp. 89-142.

Combine Russian Federation Office Action and Search Report dated Oct. 18, 2018 in Patent Application No. 2016103534/02(005530) (with partial English translation and English translation of categories of cited documents), 8 pages.

Office Action dated Jul. 24, 2018 in Japanese Patent Application No. 2016-522713, (submitting English translation only), 5 pages.

International Search Report dated May 8, 2015 in PCT/FR2014/051675 Filed Jun. 30, 2014.

Combined Office Action and Search Report dated Feb. 4, 2017 in Chinese Patent Application No. 201480048921.3 (submitting English language translation only).

Chen Weiping, et al., "Wettability of Aluminum Alloy Melt with Ceramic Reinforcements and its Control Mothods" vol. 33, No. 4, Apr. 30, 2013, pp. 316-319 (with English Abstract).

* cited by examiner

PROCESS FOR ADDITIVE MANUFACTURING OF PARTS BY MELTING OR SINTERING PARTICLES OF POWDER(S) USING A HIGH-ENERGY BEAM WITH POWDERS ADAPTED TO THE TARGETED PROCESS/MATERIAL PAIR

The present invention relates to the field of fabricating parts made out of metallic, intermetallic, ceramic, ceramic matrix composite (CMC), or metal matrix composite (MMC) material with discontinuous reinforcement, in particular ceramic or intermetallic reinforcement, by melting or sintering powder particles by means of a high-energy beam.

The term "discontinuous reinforcement" designates reinforcing elements such as short fibers (whiskers) and particles, in particular monocrystalline particles, as contrasted to continuous reinforcing elements of the long fiber type.

Among such high-energy beams, mention may be made in particular, and in non-limiting manner, of a laser beam and an electron beam. A laser beam may either be pulsed or continuous.

The invention seeks in particular to fabricate parts quickly by direct metal deposition using a laser beam or by selective melting of powder beds by laser or indeed by selective sintering of powder beds by laser.

Selective laser sintering (SLS) is a method in which a portion of the powder is melted, while the remainder remains solid. This relates in particular to fabricating parts out of ceramic material, out of CMC material, and out of certain MMC materials. For ceramic and CMC materials, the liquid phase is in the minority (generally lying in the range 0.5 percent by volume (% vol) to 3% vol) whereas for MMC materials, the liquid phase is in the majority, and rarely less than 70% vol.

Selective laser melting (SLM) designates a method in which all of the powder is melted and some of its main characteristics are summarized below with reference to FIG. 1.

A first powder layer 10 of a material is deposited on a construction support 80 e.g. using a roller 30 (or any other deposition means), which support may be a solid support, a portion of some other part, or a support grid that is used for facilitating the construction of certain parts.

The powder is transferred onto the construction support 80 from a feed bin 70 during a go movement of the roller 30, and it is then scraped and possibly lightly compacted during one or more return movements of the roller 30. The powder is made up of particles 60. Excess powder is recovered in a recycling bin 40 situated adjacent to the construction bin 85 in which the construction support 80 moves vertically.

A generator 90 is used to generate a laser beam 95, and a control system 50 is used for directing the laser beam 95 onto any region of the construction support 80 so as to sweep any region of a layer of powder. The laser beam is shaped and its diameter in the focal plane is varied respectively by means of a beam expander 52 and by means of a focusing system 54 (which together constitute an optical system).

Thereafter, the temperature of a region of this first layer 10 of powder is raised by scanning with a laser beam 95 to a temperature higher than the melting temperature $T_F$ of the powder.

The SLM method may use any high-energy beam instead of the laser beam 95 so long as the beam is sufficiently energetic to melt the powder particles together with a portion of the material on which the particles rest (also referred to as the dilution zone forming an integral portion of the liquid pool).

This beam scanning may be performed, by way of example, by means of a galvanometric head that forms a portion of a control system 50. By way of example, the control system comprises, in non-limiting manner, at least one steerable mirror 55 on which the laser beam 95 is reflected before it reaches a layer of powder that has all of its surface points situated at the same height relative to the focusing lens contained in the focusing system 54, with the angular position of the mirror being controlled by a galvanometer head so that the laser beam scans at least a region of the first powder layer, and thereby follows a pre-established profile for a part. For this purpose, the galvanometer head is controlled using information contained in a database of the computer tool used for computer assisted design and fabrication of the part that is to be fabricated.

Thus, the powder particles 60 in this region of the first layer 10 are melted and form a first one-piece element 15 secured to the construction support 80. At this stage, it is also possible to use the laser beam to scan a plurality of independent regions of this first layer so as to form a plurality of first elements 15 that are mutually disjoint, after the material has melted and then solidified.

The support 80 is lowered through a height corresponding to the thickness of the first layer (lying in the range 20 micrometers (μm) to 100 μm and generally in the range 30 μm to 50 μm).

Figure 1:
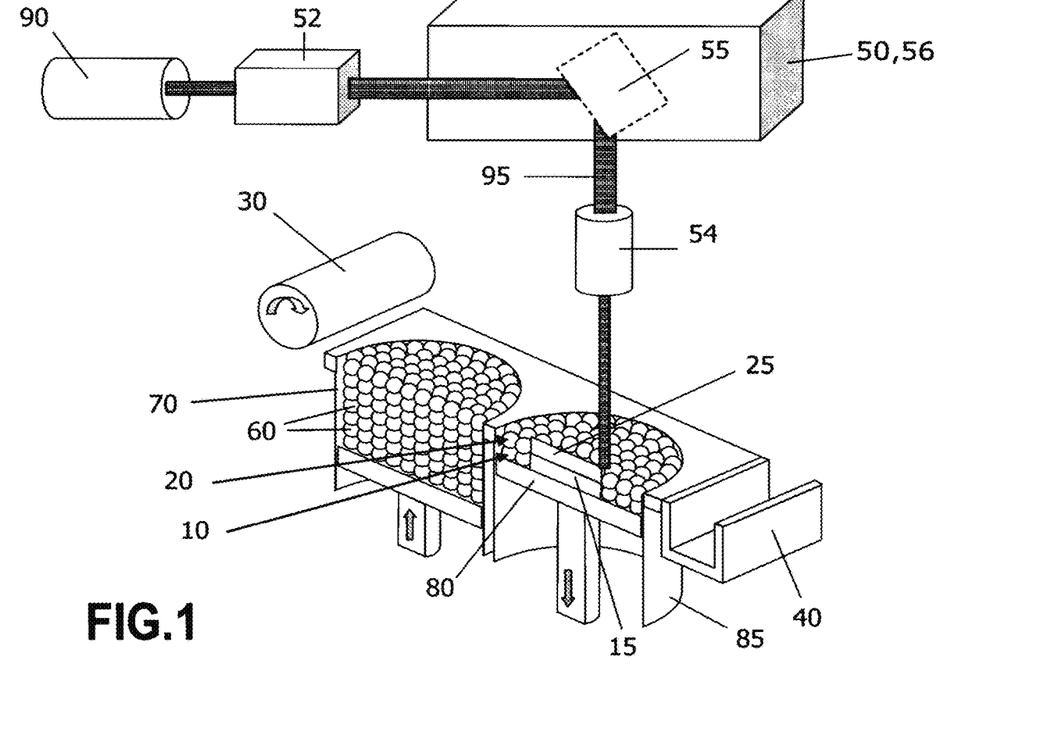
FIGS. 1 and 2, described above, are diagrams for explaining two known methods of additive fabrication involving melting powder particles and used preferably in the context of the present invention.

Thereafter, a second layer 20 of powder is deposited on the first layer 10 and on the first one-piece or consolidated element 15, and, then, a region of the second layer 20 that is situated in part or completely over this first one-piece or consolidated element 15 (as shown in FIG. 1) is heated by being exposed to the laser beam 95 so that the powder particles in this region of the second layer 20 are melted, together with at least a portion of the element 15 so as to form a second one-piece or consolidated element 25, these two elements 15 and 25 together forming a one-piece block in the example shown in FIG. 1.

It can be understood that depending on the profile of the part to be constructed, and in particular if there is an undercut surface, it can happen that the above-mentioned region of the first layer 10 is not to be found, not even in part, under the above-mentioned region of the second layer 20, and under such circumstances the first consolidated element 15 and the second consolidated element 25 then do not form a one-piece block.

This process of constructing the part layer-by-layer then continues with additional powder layers being added on the already-formed assembly.

Scanning with the laser beam 95 enables each layer to be constructed by giving it a shape that matches the geometry of the part that is to be made. The lower layers of the part cool more or less quickly as the higher layers of the part are being constructed.

Figure 2:
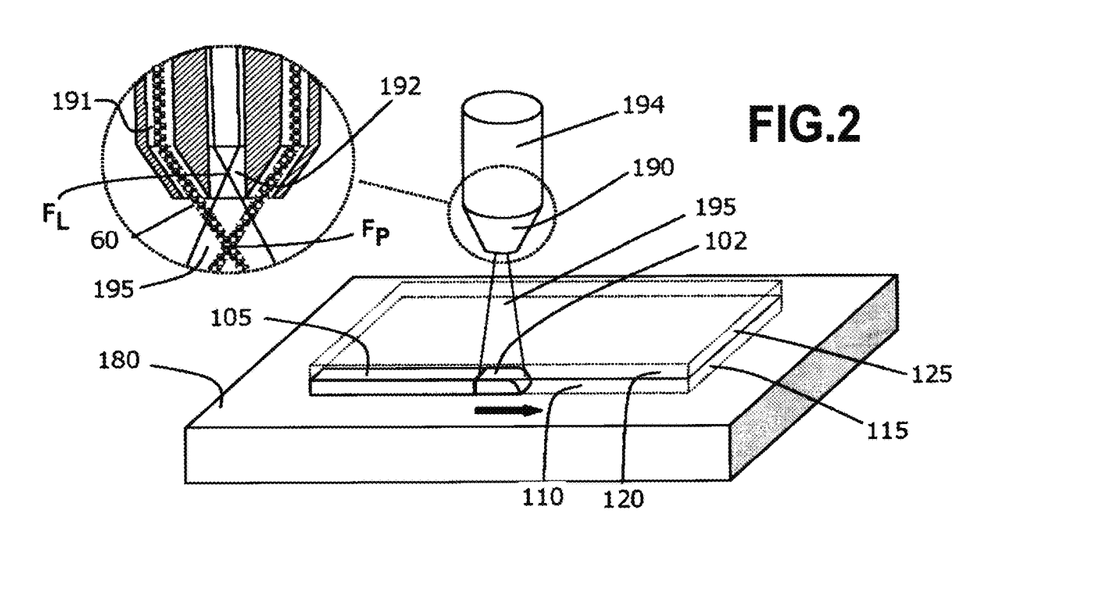

The direct metal deposition (DMD) method using a laser beam is described below with reference to FIG. 2.

A first layer 110 of material is formed on a construction support 180 by blowing powder particles 60 in an inert carrier gas through a nozzle 190. Simultaneously with blowing the powder particles 60, the nozzle 190 conveys a laser beam 195 that comes from a generator 194. The first orifice 191 of the nozzle 190 through which the powder is blown onto the construction support 180 is coaxial with the second orifice 192 through which the laser beam 195 is emitted, such that the powder is blown into the laser beam 195. The term "concentric nozzle" thus designates a beam of powder concentric with the laser beam, with the laser focal point ($F_L$) and the powder focal point ($F_P$) being in alignment on the axis of symmetry of the nozzle 190 (it being possible to adjust the laser focal point ($F_L$) relative to the powder focal point ($F_P$)). The powder forms a conical shell and the laser beam is conical in shape. The laser beam 195 raises the powder to a temperature higher than its melting temperature $T_F$, such that the powder forms a pool 102 on the support surface 180 under the laser beam 195. The pool 102 may also have begun to be formed on the support 180 by the region of the support 180 that is exposed to the laser beam 195 being melted down to a certain depth: under such circumstances, the powder feeds the pool 102 into which it arrives in the totally melted state.

Alternatively, and by way of example, the position of the nozzle 190 may be adjusted relative to the position of the laser beam, so that the powder does not spend sufficient time in the laser beam 195, or so that the speed of the powder particles leaving the nozzle is too fast, or so that the laser beam is not sufficiently energetic to melt the powder particles completely upstream from the pool, whereby the particles become completely melted only after they have reached the pool 102 that has already been formed on the support surface 180 by melting of the region of the powder 180 that is exposed to the laser beam 195.

Upstream from the pool, the powder may likewise not be melted by the laser beam 195 or it may be melted in part only as a result of some of the particles constituting the powder being of a size that is too large or as a result of the mass flow rate of the particles being too great for them to be melted completely before reaching the pool.

Finally, the powder need not be raised in temperature prior to reaching the pool that has previously been formed on the surface of the support 180, so that the powder is cold when it reaches the pool, with this being done by the nozzle 190 being adjusted relative to the laser beam in such a manner that the powder beam and the laser beam do not intercept over the work plane.

As the assembly formed by the nozzle 190 and the laser beam 195 (or the support 180) travels downstream, the pool 102 is maintained and solidifies progressively so as to form a first bead of solidified material 105 on the support 180. The process is continued to form another solidified bead on the support 180, with this other bead being juxtaposed with and parallel to the first bead, for example.

Thus, by moving the assembly formed by the nozzle 190 and the laser beam 195, or the support 180, a first layer 110 of material is deposited on the support 180, and by solidifying, it forms a first one-piece element 115 of shape that complies with the shape defined by the information contained in the database of the computer tool used for computer assisted design and fabrication of the part that is to be fabricated.

Thereafter, the nozzle 190 is caused to perform a second scan so as to form in similar manner a second layer 120 of material on the previously consolidated first element 115. This second layer 120 forms a second consolidated element 125, with these two elements 115 and 125 together forming a one-piece block. The pools 102 that are formed progressively on the first element 105 during construction of the second element 120 generally include at least a portion of the first element 115 that has been re-melted by being exposed to the laser beam 195 (also referred to as the dilution zone forming an integral portion of the liquid pool), in addition to the particles of powder that are being fed to the pools 102.

The process of building up the part layer by layer is then continued by adding additional layers to the already-formed assembly.

Scanning with the laser beam 195 enables each layer to be given a shape that is independent of the adjacent layers. The lower layers of the part cool more or less quickly while the upper layers of the part are being formed.

Alternatively, or in addition, it is possible to dissociate the path followed by the powder from the path followed by the laser beam, thereby firstly creating a melt pool that is very localized in the preceding layers by action of the laser beam that may be adjusted very accurately relative to the work plane, and secondly using a lateral nozzle to inject powder into the melt pool.

Furthermore, the above-described techniques for rapidly fabricating parts are not limiting and it is also possible in this context to consider selective laser sintering (SLS): under such circumstances, some or all of the powder particles remain at a temperature lower than the melting temperature $T_F$ of the powder.

In order to reduce contamination of the part, e.g. with oxygen, with oxides, or with any other pollutant during its layer by layer fabrication as described above, the fabrication may be performed within an enclosure having humidity and oxygen content that are controlled and appropriate for the method/material pair.

Figure 3:
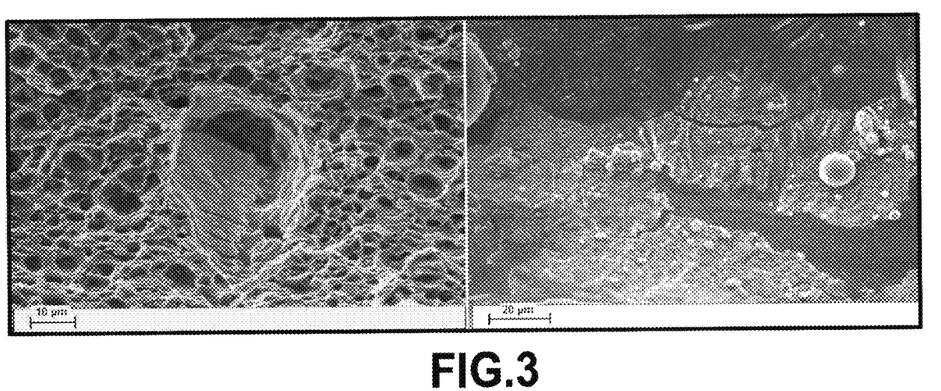
FIG. 3, described above, shows the formation of an oxide film that forms in the presence of occluded gas pores while melting an aluminum alloy in the presence of water vapor.

By way of example, as can be seen in the micrographs of FIG. 3, an oxide film forms with hydrogen being given off inside pores (occluded gas) within a molten aluminum alloy by the following reaction:

$$2Al_{(liquid)} + 3H_2O_{(vapor)} \rightarrow Al_2O_{3(solid)} + 3H_{2(gas)}$$

e.g. when using the selective laser melting method without close control over the dew point of the surrounding atmosphere (specifically the ratio of the partial pressures of $H_2$ and $H_2O$ corresponding to a quantity of water vapor). For example, a dew point at −50° C. is associated with a water vapor pressure of 38.8 parts per million (ppm).

In order to avoid any contamination by residual oxygen, the enclosure is filled with a gas that is inert (not reactive) relative to the material under consideration, such as nitrogen ($N_2$), argon (Ar), carbon monoxide (CO), carbon dioxide ($CO_2$), or helium (He), optionally with a small quantity of hydrogen ($H_2$) that is added for its reducing power. A mixture of at least two of these gases may also be considered. In order to prevent contamination, in particular by oxygen from the surrounding medium, it is common practice to arrange for the enclosure to be at higher than atmospheric pressure.

Thus, in the present state of the art, selective laser melting or direct melting deposition can be used to construct parts having a low level of pollution and good dimensional accuracy, with a three-dimensional shape that may be complex but with mechanical strength that is still insufficient for certain applications and therefore requires the method to be optimized better and in particular requires better optimization of the construction of the powders.

Selective laser melting or direct metal deposition also preferably makes use of a powder made up of particles presenting morphology that is spherical, composition that is homogeneous, that are clean (i.e. not contaminated by residual elements coming from synthesizing the powder), and that are fine (the dimension of each particle lying in the range 1 μm to 100 μm, and preferably in the range 1 μm to 50 μm, or indeed in the range 1 μm to 25 μm), thus making it possible to obtain an excellent surface state for the finished part.

Selective laser melting or direct metal deposition also make it possible to reduce the time required for fabrication, and to reduce costs and overheads, compared with parts made by molding, injection-molding, compacting and sintering, and surface or internal machining.

Parts prepared by selective laser melting or by direct metal deposition nevertheless present drawbacks.

Figure 6A:
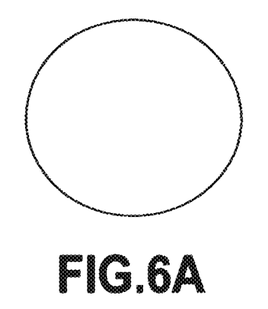
FIGS. 6A to 6J, described above, show various pre-alloyed powders having a single component (both in homogeneous composition, FIG. 6A, and in heterogeneous composition, FIGS. 6B, 6C, 6D, 6E, 6F, 6G, and 6H), or having multiple components (also referred to as composite powders, FIGS. 6I to 6J) of constitution or structure that differs depending on the methods of synthesizing these pre-alloyed powders.

Wherever possible, present practice consists in using a pre-alloyed powder (FIG. 6A) of single-component particles, of shape that is substantially (or quasi) spherical, that are dense (without pores internal to the particles, i.e. without any occluded gas in the particles), and that are not contaminated and without surface oxidation, that are of composition that is homogeneous, i.e. that is the same throughout the entire volume of each particle, and that is identical to the intended composition for the part made by the method of melting powder particles. Under such circumstances, the particles are formed continuously, they are of homogeneous composition, and in accordance with the invention, they are quasi-spherical and dense. They may be constituted by a single chemical element (single-element powder) or by a plurality of chemical elements (multi-element powder).

Nevertheless, it is sometimes necessary to use a mixture comprising several types of powder in which the morphology, density, mean size, size distribution, composition, chemical uniformity, oxygen contamination on the surface and in bulk, state of agglomeration, specific surface area, and pourability of each powder, in other words the constitution or the architecture of each powder, and also their costs, need to be adapted to the specific features of such rapid fabrication methods in order to satisfy the specifications for the parts to be fabricated.

The use of a bulk-blended (non-agglomerated) mixture of a plurality of types of powder of different compositions, and in particular of powders that are easily available on the market, makes it possible to obtain the desired mean composition quickly and at low cost, either by using powders made up of particles constituted by a single chemical element (mono-element powders), or by using powders in which the particles are themselves made up of a plurality of chemical elements (multi-element powders), or by having recourse to using powders of both of these categories.

Nevertheless, the use of a bulk-blended mixture of several types of powder presents a certain number of problems.

In particular, it is found that it is difficult to make such a bulk-blended mixture of powders of different compositions to flow through powder dispensers and through the nozzle when using the DMD method. Furthermore, with the SLM method, it is depositing and uniformly spreading the bed of powders that can be affected by using such a bulk-blended mixture of powders.

Furthermore, by using a mixture of several types of powder (single-element powder(s) and/or multi-element powder(s)), it is not easy to achieve homogeneous melting of all of the particles of the powders. The particles of each of such powders present their own melting temperatures, and as a result there sometimes exists a significant difference between their melting temperatures.

There is therefore a clear risk that it will not be possible within the time available (which corresponds to the duration of laser/material interaction) to make a melt pool that is of composition that is homogeneous and in compliance with the target composition, and in which all of the particles of the powders that are present are completely dissolved, unless there is a possibility, for example, of increasing the power of the laser or of decreasing the speed of scanning so as to increase the temperature and/or the volume of the pool without degrading its stability and thus the stability of construction.

Depending on the reactivity of the various powders of the mixture, it could also happen that brittle intermetallic phases are formed, which often give rise to ruptures of as-fabricated parts.

Figure 4A:
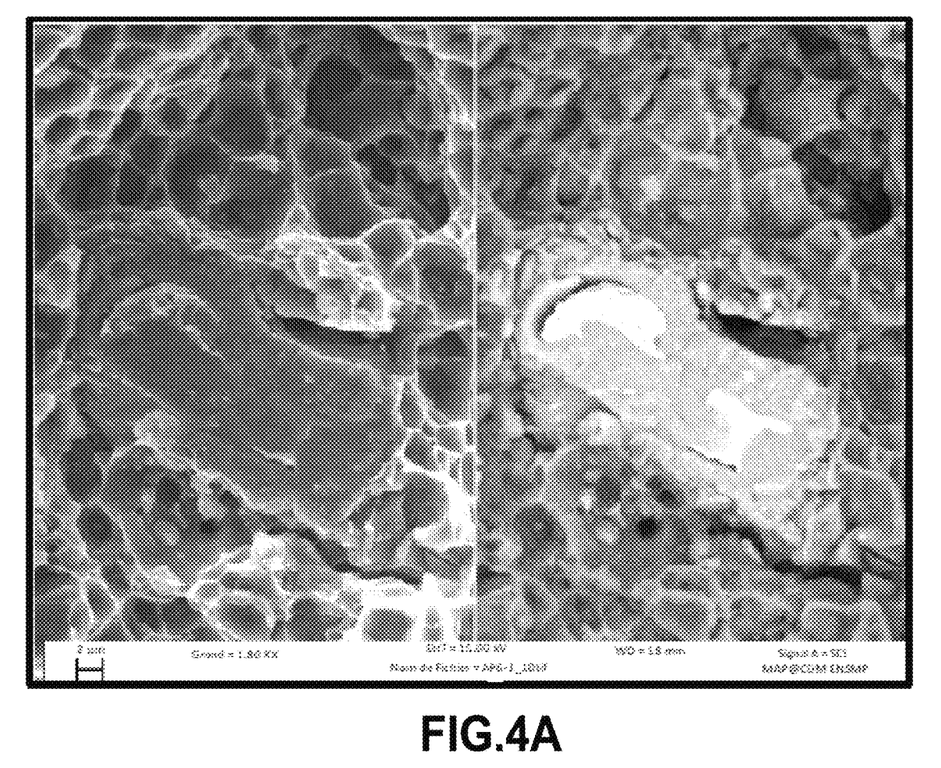
FIGS. 4A, 4B, and 4C, described above, are micrographs of rupture patterns of test pieces presenting intermetallic occlusions as a result of an aluminum-rich liquid reacting with refractory particles based on iron or on nickel that act as additives in order to obtain the desired composition for the aluminum alloy.
Figure 4B:
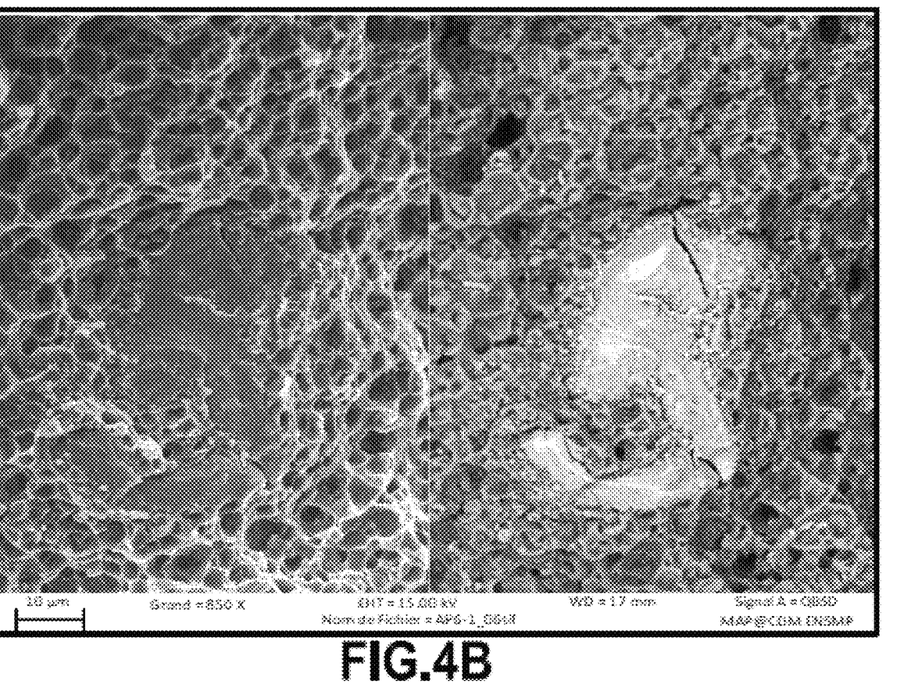
Figure 4C:
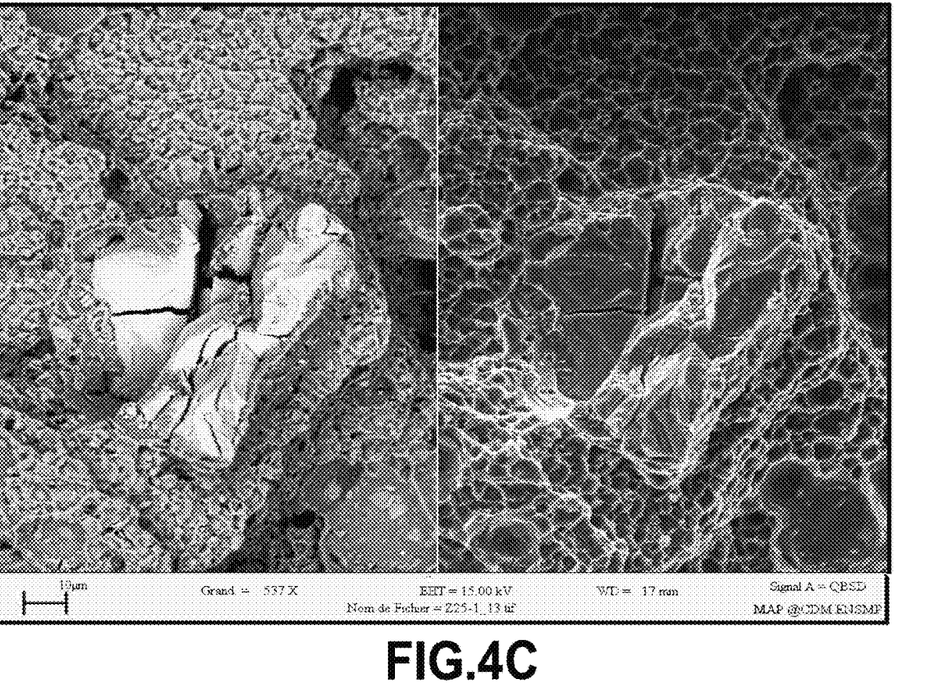

This situation is illustrated by the micrographs of FIGS. 4A to 4C which show the rupture patterns of test pieces that were obtained using a first AlSi10Mg alloy powder together with a small volume fraction of a second powder constituted by various compositions of reactive and refractory particles (based on iron and chromium in FIG. 4A, based on nickel, chromium, and cobalt in FIG. 4B, and based on iron, nickel, and chromium in FIG. 4C), the micrographs being obtained by a scanning electron microscope with various different settings so that one of the two views in each micrograph shows the topography (a secondary electron (SE) image), while the other view shows the chemical composition differences (backscattered electron (BSE) image). The larger particles of the second powder could not be put into solution and they have formed intermetallic inclusions, resulting in the test pieces rupturing.

The above-described phenomenon may be made worse by a large range of grain sizes in the second powder and by a large mean size for the second powder, which second powder presents the highest melting temperature of the various powders making up the reactive mixture.

Likewise, by using particle sizes that are similar, of large mean size and of melting temperatures that are very different among the various powders in the mixture that are considered in this example as being not reactive but soluble, it is possible with such melting methods to encounter particles that are not completely melted and/or completely dissolved in the liquid, with the largest particles floating on the surface of the pool. These may in particular be particles of refractory material such as ceramics or intermetallic phases.

Figure 5:
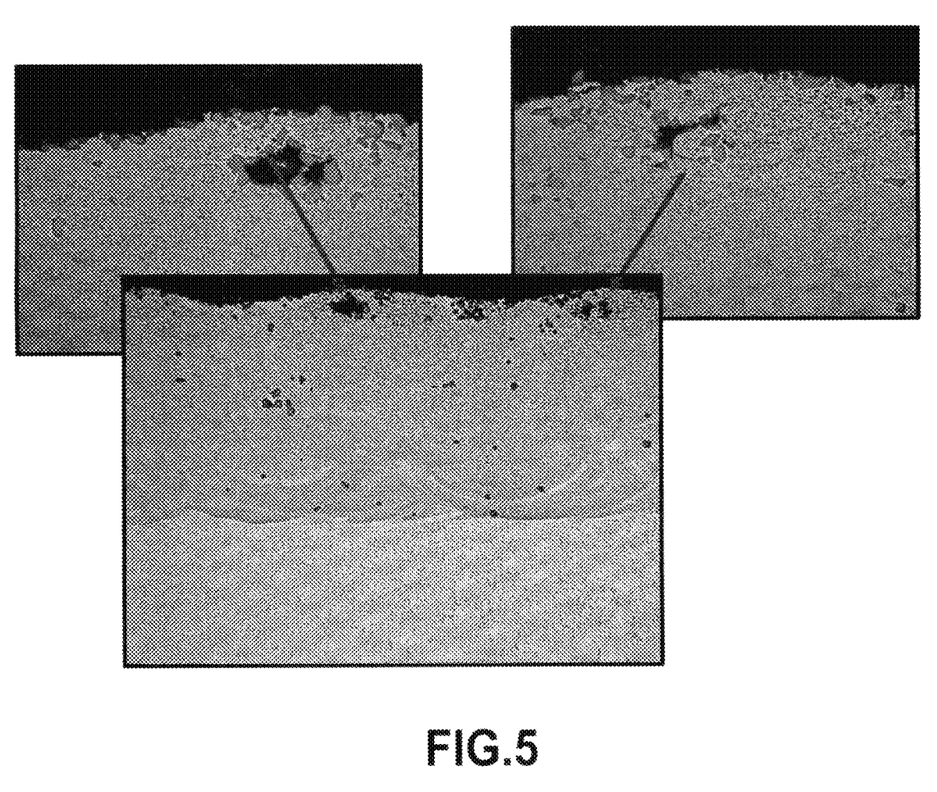
FIG. 5, described above, corresponds to micrographs showing a steel part reinforced with lower-density titanium carbide particles, some of which have not been put completely into solution and have not been able to solidify in the form of primary dendrites.

By way of example illustrating this situation, the micrographs of FIG. 5 relate to a part made of steel that is reinforced with particles of titanium carbide, and in which some of these particles of the most refractory powder in the mixture have not been put fully into solution in the liquid pool, and as a result have been concentrated at the surface of the pool, sometimes surrounding and even trapping pockets of gas.

This situation is particularly marked when the particles, in particular refractory particles, are of density that is low in comparison with the other powders of the mixture and are present in a non-negligible volume fraction. After the liquid pool has melted, these non-melting items can interfere with the adhesion of the following layer or with putting the following layer into place, and they can even lead to defects of fabrication (macroscopic pores) if these unmelted particles are large in size and volume. Specifically, these unmelted particles constitute inclusions that are hard in a matrix that is itself ductile and thus they contribute to premature rupture of the fabricated part.

Furthermore, the dissolving of these various types of powder, which may sometimes be incomplete or indeed delayed, can lead, very locally during cooling, to chemical segregation phenomena (for a mixture of non-reactive powders) leading to eutetic phases of low melting point and/or to undesirable chemical reactions between the particles (for a mixture of reactive powders) leading to the presence of undesired hard phases (e.g. intermetallic phases, such as those of FIGS. 4A, 4B, and 4C), thereby leading to the microstructure of the resulting as-fabricated material not corresponding to the microstructure that is in fact desired, and presenting mechanical strength properties that are not as good as the properties desired for the application under consideration, and also presenting a risk of burning at the end of subsequent heat treatment.

Likewise, if the various powders of the non-reactive mixture are not sufficiently mutually wettable, possibly as a result of the total absence of solubility between the powders, then "sound material health" will not be achieved for the parts.

An object of the present invention is to provide a method of fabricating a part having desired composition and microstructure in a material that may be metallic, intermetallic, ceramic, ceramic matrix composite (CMC), or metal matrix composite (MMC) with discontinuous reinforcement, by melting powder particles by means of a high-energy beam, the method making it possible to overcome the drawbacks of the prior art.

In particular, by this invention, it is desired to obtain a part of homogeneous composition that matches the desired composition, with an absence of defects of fabrication, with an appropriate macro- and microstructure (size and morphology of the grains, and then morphology, fineness, and composition of the phases) in the as-fabricated part (i.e. in the part at the end of the melt fabrication step), of good dimensional quality (ensured by good stability of the pool), with minimum residual stresses, with the greatest possible total mass yield of the method (melting+recycling) and with good fabrication speed or time, and for this to apply regardless of the materials involved.

This object is achieved by the fact that the powder used is a single powder of particles that present sphericity lying in the range 0.8 (corresponding to a cube) to 1.0 (corresponding to a sphere) and of form factor lying in the range 1 (corresponding to a sphere) to $\sqrt{2}$ (corresponding to a cube), each powder particle presenting substantially identical mean composition, and in that the grain size distribution of the particles of said powder is narrowed around the mean diameter value $d_{50\%}$ in such a manner that:

$$(d_{90\%}-d_{50\%})/d_{50\%} \leq 0.66$$

and $$(d_{50\%}-d_{10\%})/d_{50\%} \leq 0.33$$

with $$(d_{90\%}-d_{10\%})/d_{50\%} \leq 1.00$$

Preferably, the grain size distribution of the particles, defined by the "span" value:

$$(d_{90\%}-d_{10\%})/d_{50\%}$$

is less than or equal to 0.50, with:

$$(d_{90\%}-d_{50\%})/d_{50\%} \leq 0.33$$

and $$(d_{50\%}-d_{10\%})/d_{50\%} \leq 0.17$$

The term "sphericity" is used to mean the sphericity factor (a dimensionless number) as defined by Wadell as follows: the ratio of the surface area of a sphere having the same volume as the particle to the surface area of the particle in question ($\Psi_v$), which is also equivalent to the square of the ratio between the volume equivalent diameter and the area equivalent diameter.

Preferably, this sphericity factor is greater than 0.82, advantageously greater than 0.85, and still more advantageously greater than 0.90, with an even more advantageous situation when the sphericity factor is greater than 0.95.

Advantageously, all of the particles of the single powder used in accordance with the invention present a form factor lying in the range 1 (corresponding to a sphere) to $\sqrt{2}$ (corresponding to a cube). This form factor which gives a good indication of the slenderness ratio of the particles is defined as the ratio between the maximum Feret diameter (maximum distance between two tangents parallel to opposite sides of the particle) and the minimum Feret diameter (minimum distance between two tangents parallel to opposite sides of the particle).

Preferably, this form factor is less than 1.3, advantageously less than 1.25, and still more advantageously less than 1.15, with an even more advantageous situation when the form factor is less than 1.05.

In the present specification, the term "particle" corresponds to a physical entity that is isolated from the other physical entities of the powder in question, and may correspond to various situations including those shown in FIGS. 6A to 6J.

Thus, in the invention, use is not made of a bulk-blended mixture (non-agglomerated particles) of two or more different powders.

Specifically, in the invention, use is made of a single powder in which the "particles" (which may possibly be macro-particles that are isolated from one another) all present on average the same composition.

It should thus be observed that the identical mean composition of all of the "particles" of the single powder used in the method of the present invention corresponds to a chemical composition that is close or identical to that of the material that is to be obtained in the part made by the additive fabrication method.

In this way, by not using a bulk-blended mixture of a plurality of powders, i.e. by using a single powder, it is ensured there are no isolated particles of the various powders in the mixture, having melting temperatures that are different, and possibly very different, and/or having mean sizes and size distributions that need not be equivalent and/or in which the fineness of each of the powders in the mixture makes it difficult to obtain a homogeneous mixture, and/or in which the densities of the powders are different, or even very different, and/or in which the volume fraction of any one of these various powders is small relative to the others.

In order to fabricate parts made of MMC material from a powder mixture, the inventors have seen clearly that it is necessary to have a single powder presenting simultaneously good pourability (as provided by a powder that is coarse and spherical) and with rapid dissolution between individual particles, e.g. ceramic particles and metal particles (made possible by having individual particles that are fine, particularly for the particles of refractory material). Nevertheless, using fine individual particles for each of the powders of the mixture is found to be difficult because there is a considerable risk of the particles agglomerating during mixing. Because the forces of adhesion between the individual particles increase with reducing particle size, these forces can become greater than the force of gravity. Furthermore, fine individual particles enhance the concentration of electrostatic charge, which can lead to dust exploding. However, the finer the size of the individual particles in the mixture, the easier it is to dissolve them and the more the assembly presents properties that are homogeneous. Thus, there is no way of avoiding the use of macro-particles constituted by a homogeneous mixture of fine individual particles that come from different powders and that are bonded together by a binder.

Thus, in the invention, use is made of a single powder of appropriate composition that forms a powder that is pre-alloyed in the broad sense of the term (single-component powder (atomized powders, coated powders, mixed powders, mixed and ground powders, encrusted powders, . . . ) or multi-component powder (agglomerated powders, . . . )), in which the "particles" present a high degree of sphericity (sphericity greater than 0.7, preferably greater than 0.8, and advantageously greater than 0.9).

When performing methods for synthesizing this single powder, care should be taken to ensure that the "particles" are free from any occluded gas and are not contaminated with certain chemical elements, or at least that these elements are present at concentrations below those that are unacceptable for the intended application.

In certain situations, it may be appropriate to have recourse to using an additive fabrication enclosure that is under an atmosphere that is controlled (in terms of oxygen and water vapor partial pressures), at a regulated pressure that is greater than atmospheric, or preferably slightly less than atmospheric.

Whenever possible, the "particles" of this single powder are single-component particles, i.e. they are constituted by a single component, i.e. they are formed from continuous material of homogeneous composition (FIG. 6A), or of composition that is heterogeneous (i.e. not homogeneous) at the scale of a "particle" (FIGS. 6B, 6C, 6D, 6E, 6F, 6G, and 6H).

The powder used is preferably obtained by subjecting a parent alloy to atomization or to centrifuging (in particular with a rotating electrode) so that the composition of the powder is then homogeneous at the scale of a particle, but not necessarily at the scale of its microstructure.

For example, and in preferred manner if the melting temperature, the chemical composition, and the reactivity of the powder make this possible, the pre-alloyed powder is made up of mono-component "particles" that are formed from continuous material of composition that is homogeneous at the scale of a "particle", being made up of a single chemical element (single-element powder) or more often of a plurality of chemical elements (multi-element powders), being of morphology that is spherical or quasi-spherical (FIG. 6A), and being used in the method of the present invention by gas atomizing or by rotating electrode type centrifuging a rotating and molten parent alloy from which droplets form and cool in flight within an enclosure under a protective or inert atmosphere, in order to form the particles of the powder. Such a parent alloy may for example be made of metal.

After recovering solidified droplets from the bottom of such equipment, the finest coming from separator cyclones of the atomizing device, these droplets are sorted selectively, initially by screening with the assistance of pneumatic vibration for a certain size range in the limit 30 µm to 40 µm, and subsequently by elutriation (air or gas turbine) for finer particles to a limit of about 1 µm.

Another situation similar to the above differs solely by the fact that the single-component "particles" of the pre-alloyed single powder (i.e. multi-element particles made of continuous material) present a composition that is heterogeneous at "particle" scale).

Such pre-alloyed powders may be produced by various methods of synthesis or by a combination of various methods of synthesis, in particular methods relying on applying mechanical or thermomechanical treatment while dry, while wet, or under an inert gas (in particular by conventional grinding or milling using beads, balls, knives, hammers, disks, or wheels, . . . , or by combined milling at more or less high energy and preferably between a ceramic powder and a metallic powder in a high energy planetary ball mill (milling by mechanical alloying), or indeed for very specific applications by cryogenic milling, reactive milling between reactive solid particles or solid particles and reactive gas, or by mechanical melting), chemical or thermomechanical treatment (in particular by chemical vapor deposition (CVD), plasma enhanced (or assisted) chemical vapor deposition (PECVD or PACVD), and organo-metallic chemical vapor deposition (OMCVD)), or reactive synthesis (in particular by self-propagating combustion known as self-propagating high temperature synthesis (SHS)).

It should be recalled that unlike gas atomization and centrifuging of a metal alloy, both of which give particles that are very spherical and of high chemical purity, mechanical or thermomechanical milling or indeed mechanical alloying of metal powders preferably introduces impurities coming from milling elements and makes it impossible to control accurately the morphology and the size of the particles. Nevertheless, the morphology of the particles is generally isotropic and fairly spherical.

Various types of pre-alloyed powder are thus obtained in which the "particles" are single-component particles of composition that is heterogeneous at "particle" scale, such as those shown in FIG. 6B to 6H.

According to an advantageous possibility, the powder used is obtained by coating or encrustation.

Figure 6B:
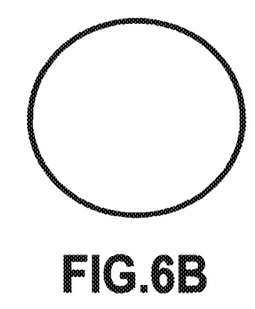

FIG. 6B shows one such particle of pre-alloyed powder formed as a single- or multi-element particle of homogeneous composition that is coated or covered, having a core that is continuous and made of a first material and a covering that is continuous and made of a second material of composition that is different from that of the first, which second material, by way of example, is deposited in a vacuum by Chemical Vapor Deposition (CVD) or by physical vapor deposition (PVD), or by thermochemical treatment in fluidized beds while wet or while dry, or indeed by thermomechanical treatment of the mechanical melting type.

The metallic covering obtained by mechanical melting of hard particles serves to improve the ductility and the toughness of MMC having a large volume fraction of non-oxide ceramic reinforcement (carbides, nitrides, silicides, and borides) or intermetallic reinforcement, since, with such volume fractions, the melting of such a metal covering by means of a high-energy beam greatly facilitates spreading it among the ceramic reinforcement that remains solid. It should be mentioned that the covering of pre-alloyed particles by the above-mentioned synthesis methods may be of the multilayer type.

In another advantageous possibility, the powder used is obtained by milling/mixing, i.e. mechanical milling/mixing by impacts or attrition (friction wear), or by shear or compression, or indeed a combination of two or more of these stresses. The final mean size of the particles depends on the milling technique used, on the characteristics of the milling elements (type of material, shape, size), on the milling time, on the milling medium (milling dry or in a controlled atmosphere, in an aqueous or non-aqueous medium, with or without any dispersant), on the load ratio (mass of milling elements over mass of powder), and on the speed of rotation of the milling elements and/of the jar.

Figure 6C:
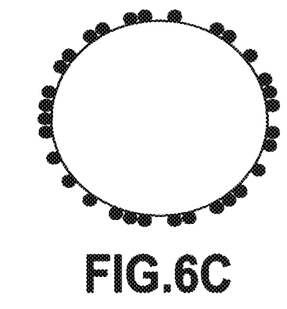

FIG. 6C shows the circumstance of a particle of pre-alloyed powder obtained by encrustation. In particular, fine hard particles of a first powder are encrusted on the surface of ductile particles made of one or multiple elements that are of homogeneous composition and of much larger size, being obtained from a second pre-alloyed powder. One of the ways of achieving this result is mechanical alloying, which consists in mixing a second powder that is fine and of great hardness at high energy and in desired volume proportions with a first powder that is ductile and coarse. This may be performed by attrition and/or under the impact of beads by using a planetary mill. The energy is released by the milling container (jar) rotating in the opposite direction to the support disk, possibly under a protective gas. For example, the particle of pre-alloyed powder that can be seen in FIG. 6C is constituted by a core made of a homogeneous composition of Ti6Al4V metal alloy and a covering made of fine individual ceramic particles (e.g. of $TiB_2$ or TiC) or non-metallic particles (e.g. boron (B)) that are encrusted on the surface of the Ti6Al4V.

Figure 6D:
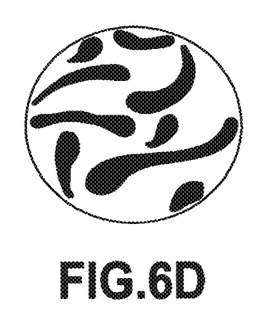

FIG. 6D shows a particle of pre-alloyed powder of the dispersed type, but in which the material is continuous and obtained by intimate mixing of two or more particles of original powders having different chemical compositions, preferably comprising ductile metal alloys made of multiple elements: for example, the portions of two original powders can be seen in FIG. 6D drawn respectively pale and dark, the two original powders themselves having particles of homogeneous but different compositions that have been deformed plastically and become bonded at many locations between one another in order to form the pre-alloyed powder particle of FIG. 6D (the sizes of the particles of the two original powders may be of the same order of magnitude, or they may merely be different).

Figure 6E:
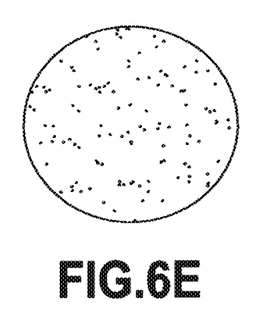

FIG. 6E shows a particle of pre-alloyed powder of the dispersed type but in which the material is continuous and obtained by intimate mixing of two or more particles of original powders of very different sizes and of different chemical compositions, preferably comprising a ductile metal alloy and individual particles that are hard, in particular oxide particles (thereby providing oxide dispersion strengthened (ODS) materials): for example, there can be seen respective pale and dark portions of the two original powders in which the particles are of homogeneous but different compositions, the pale particles of the first powder being deformed plastically and being bonded at numerous locations with the hard particles of the second powder that are drawn dark, so as to form the pre-alloyed powder particle of FIG. 6E.

In both of these two particles, a technique of pre-alloying by milling and intense mechanical mixing is used at medium or high energy, often requiring the use of a planetary mill.

Figure 6F:
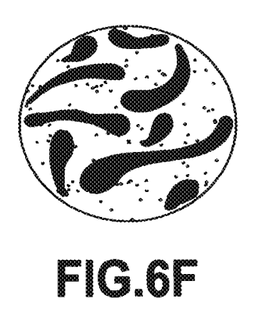

FIG. 6F shows a pre-alloyed powder particle that combines the characteristics of the powder particles of FIGS. 6D and 6E: this pre-alloyed powder particle is of the dispersed type, but its material is continuous and obtained by intimately mixing together three original powders of different chemical compositions, including two ductile metal alloy powders: for example in FIG. 6F, there can be seen a white matrix obtained from one or more particles of large size, large dark portions each coming from a single particle of medium size or possibly a size close to that of the first powder, together with dark individual particles of much smaller size that are hard, and in particular that are particles of oxides.

Figure 6G:
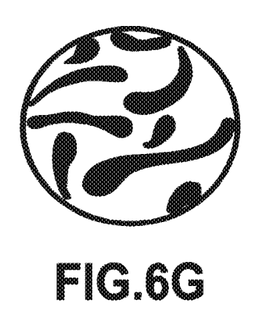

FIG. 6G shows a pre-alloyed powder particle combining the characteristics of the powder particles of FIGS. 6B and 6D: a first preparation step serves to obtain pre-alloyed powder particles like those of FIG. 6D, i.e. of the dispersed type, but in which the material is continuous and obtained by intimately mixing two or more particles of original powders of different chemical compositions, preferably comprising ductile metal alloys made up of multiple elements: this constitutes the core of the FIG. 6G particle. A second preparation step serves to form the continuous covering that is made out of a second material of composition that is different from that of the first material forming the core.

Figure 6H:
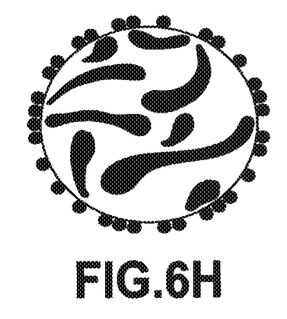

FIG. 6H shows a pre-alloyed powder particle combining the characteristics of the powder particles of FIGS. 6D and 6C: a first preparation step serves to obtain pre-alloyed powder particles like those of FIG. 6D, i.e. of the dispersed type, but in which the material is continuous and obtained by intimately mixing two or more particles of original powders of different chemical compositions, preferably comprising ductile metal alloys made up of multiple elements: this constitutes the core of the FIG. 6H particle. A second preparation step serves to form the discontinuous covering by encrusting hard fine particles of a second powder on the surface of ductile particles of heterogeneous composition and of much larger size as obtained from a first pre-alloyed powder, such as the particles of FIG. 6D.

Figure 6I:
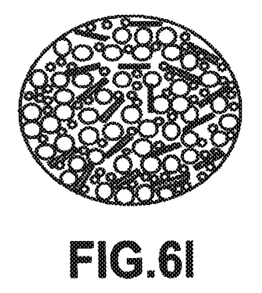
Figure 6J:
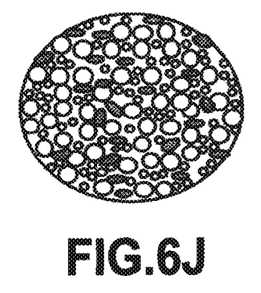

In other situations, as shown in FIGS. 6I and 6J, the "particles" of this unique powder are multi-component particles, i.e. each of them is made in identical manner out of a plurality of components (or individual particles), that are of different chemical compositions, and that are connected together by an organic or non-organic binder so as to constitute a "macro-particle". It is also possible to refer to composite powders. Under such circumstances, the particles are formed discontinuously, they are of heterogeneous composition, and in accordance with the invention, they are quasi-spherical.

The use of a binder in synthesizing this agglomerated powder imparts the characteristics of discontinuous material to the agglomerate and justifies calling it a powder of multiple-component particles.

Under certain circumstances, the binder is eliminated after the agglomeration step by using a consolidation step that consists in pyrolyzing or evaporating the binder by raising the temperature of the agglomerated powders.

Such a "particle" of the "macro-particle" type may be obtained by granulation comprising agglomerating individual components or particles of different sizes, shapes, and/or chemical compositions in the presence of moisture, followed by drying. Preparing powder particles of the "macro-particle" type by agglomeration-drying or by spray-drying a slip nevertheless requires good control over the following stages:

formulating the slip, in particular by appropriately selecting the solvent, the dispersant, the plasticizer, and the binder (stability, homogeneity, rheological behavior, and settling);

spraying the slip and drying the droplets (size and size distribution of the droplets, speed and method of drying): this granulation of the mixture of individual particles in the form of a suspension makes it possible by atomization at low temperature (in a flow of air or inert gas at high temperature) to transform it into agglomerates that are spherical and comparable in size, often greater than 50 µm and of pourability that is excellent; and     a step of consolidating granules as formed in this way (oven, flame, or plasma torch treatment) may sometimes be envisaged if it is desired to have agglomerates that are of greater density and cohesive. Furthermore, the binder may give rise to problems during additive fabrication using such agglomerated powders from which the binder has not been removed, hence the advantage of eliminating the binder. Oven treatment makes it possible to consolidate the structure of the granules without modifying their characteristics, whereas oxyacetylene flame treatment leads to the granules melting in part, sintering, and being made spheroidal, thereby changing their morphology.

Thus, this single powder is thus made up of "macro-particles" also referred to as "agglomerates", "aggregates", or indeed "granules", and they constitute a powder commonly known as an "engineered" powder.

Various types of engineered powder or pre-alloyed powders of multi-component particles such as those visible in FIGS. 6I and 6J can be obtained.

In an advantageous possibility, the powder used is obtained by granulating a suspension, also known as a slip. The slip is an aqueous or non-aqueous suspension of fine powders made up of individual particles, possibly of a mixture of individual particles, that differ in shape, in composition, and/or in size. The solvent must have a low boiling point and low viscosity. It must serve to dissolve the binder, which may be organic or non-organic, to dissolve the plasticizer, and also to dissolve various additives such as deflocculants, or dispersants, and wetting agents. In contrast, the solvent must be neither soluble nor reactive with the individual particles of the engineered powder. Although flammable and toxic, organic solvents still remain in widespread use because of their low viscosity, their low surface tension ($\gamma_{lv}$) enhancing wetting of the individual particles, their high vapor pressure leading to the granules drying quickly. Nevertheless, aqueous solvents are beginning to take over from organic solvents for manifest reasons of the environment and of expense. Water presents the major drawback of evaporating slowly. After the solvent has evaporated, the binder provides mechanical cohesion between the individual particles of the granules, and enables them to be manipulated and transported. Generally, a plasticizer, which is often a polymer of low molecular weight, is added to the binder in order to lower its viscosity and reduce its glass transition temperature (Tg). Adding plasticizer serves to increase the plasticity of the granules, as the word "plasticizer" indicates.

"Particles" made up of macro-particles of composite powder obtained by granulation are shown in FIGS. 6I and 6J, these are granules made up of individual components or particles interconnected essentially by a binder, e.g. hydrosoluble polymers such as vinyl polymers, acrylic polymers, polyimines, and polyoxides, and also polymers in emulsion and polymers of natural origin.

In FIG. 6I, there are two types of individual particles or individual components: various sizes of ductile metal individual particles that are drawn pale and brittle individual components made of short fibers (or "whiskers") that are drawn dark. These are generally ceramic or intermetallic type refractory fibers acting as reinforcement in order to increase the mechanical strength of the metal matrix, providing the volume fraction of the reinforcement is sufficiently large. These brittle and refractory individual components of ceramic and/or intermetallic type could equally well be of equiaxed or spherical shape. What's more, a mixture of metal individual particles and of refractory individual components of various shapes may be considered.

In FIG. 6J, there are several individual particles or individual components of the same types, in particular metallic but sometimes also ceramic or intermetallic, or different sizes, of different shapes, and of different chemical compositions, specifically in the example shown three metallic individual particles: small individual particles drawn pale (e.g. of aluminum); large individual particles drawn pale (e.g. of titanium); and ovoid individual particles drawn dark (e.g. of niobium).

In order to form these composite powders, the starting material is generally a homogeneous mixture of several types of particle (a plurality of single-element and/or multi-element powders, where the term "element" relates to a chemical element) that present a mean size, a size distribution, and morphology that are adapted to synthesizing macro-particles by using known mixing and agglomerating techniques with a binder additive (e.g. an organic binder) and other additives, with or without densification (or consolidation) and spheroidization. Those techniques are well known in powder metallurgy, and they serve to obtain a relatively narrow and homogeneous distribution of a plurality of different powders making up the mixture having the initially targeted mean composition, low porosity, and "particles" of spherical morphology constituted by said macro-particles.

The above examples shown in FIGS. 6A to 6J serve to illustrate the structure or the constitution of powder particles coming within the context of the present invention, and naturally they are not limiting.

These various pre-alloying methods of varying cost and cleanness are adapted firstly to the volume fraction, the specific surface area, the ductility (or hardness), the melting temperature, the reactivity, the absorptivity relative to the radiation emitted by the laser, the density, and the nature of the chemical bonds between the various individual components of the powder, and secondly to the chemical composition of the homogeneous liquid obtained by partial or complete melting of said powder (it should be recalled that the powders are sometimes made up of particles having melting temperatures that are very different). Furthermore, in the invention, the range of possible sizes for macro-particles of the composite powder (defined by $d_{90\%}-d_{10\%}$ or even and preferably by $d_{100\%}-d_{0\%}$), relative of the value of the mean or median diameter ($d_{50\%}$) is small in order to avoid having too great a departure in size between the macro-particles and in order to avoid having granules that are too coarse ($d_{50\%}$ close to 50 µm).

As a general rule, in the invention and for any type of powder described in the present application, it is necessary to ensure that the particles present a grain size distribution that is relatively narrow. Nevertheless, for the composite powder, the granulation method leads to "particles" having a size distribution that is the narrowest and to powder that is the coarsest. Furthermore, this agglomerated composite powder is better adapted to the DMD method than to the SLM method. It should be recalled that in practice better compactness of the bed of powder deposited on the fabrication plate is obtained by using a wide distribution of particle sizes, as can be obtained by atomizing.

In the invention, $(d_{90\%}-d_{50\%})/d_{50\%}$ and $(d_{50\%}-d_{10\%})/d_{50\%}$ are two limits, with the first limit being less than or equal to 0.66 (66%), or indeed less than or equal to 0.33 (33%), and preferably less than or equal to 0.17 (17%), and with the second limit being less than or equal to 0.33 (33%), or indeed less than or equal to 0.17 (17%), and preferably less than or equal to 0.08 (8%).

Nevertheless, the use of composite powders (also referred to as granules, aggregates, or agglomerates) having a desired composition and presenting spherical morphology makes it much easier for them flow through the powder distributor(s) and through the nozzle when performing the DMD method and also makes it much easier for them to be spread homogeneously as a bed of powder on the fabrication plate when performing the SLM method. Granulating the homogeneous mixture of individual particles of different powders in order to form a single powder made up of macro-particles also makes that powder easier to handle, to transport, and to store, by avoiding particles of these different powders that have different sizes and/or different densities segregating or sedimenting (where the smallest and/or the heaviest particles tend to flow easily in the gaps within the granular structure). There are numerous granulation techniques in the science of powder metallurgy and they are well known to the person skilled in the art.

The use of a composite powder made up of macro-particles makes it possible to envisage using, from among the various powders for mixing, a powder that is made up of refractory particles that are preferably fine and in moderate quantity. Under such circumstances, the technique of fabricating this composite powder requires the mixing of the various powders to be homogeneous before being followed by an appropriate granulation technique. Under such circumstances, such a technique makes it possible not only to avoid firstly problems of spreading a layer and obtaining a powder bed that is homogeneous for SLM and secondly problems of flowing through the nozzle, but also prevents the fine particles dispersing (spreading) at the outlet from the nozzle in DMD, with this applying in particular since they are of low density, thereby guaranteeing that the liquid pool is of a composition that is repeatable (or reproducible).

It is important for the particles of the various powders to be mixed in homogeneous manner before performing the granulation method. If this is not ensured, there can be granules or macro-particles of different compositions, which leads to the composition of final part then being heterogeneous. Mixing is more difficult to make homogeneous when the volume fraction of one of the powders is small compared with the others (e.g. adding rare earths to the mixture as deoxidizing elements or adding surfactants to the mixture in order to facilitate wetting between solids and liquids).

There exist other pre-alloying techniques for single-component powders, such as "splat cooling" and "melt spinning", but they are nevertheless much less widespread in industry and they are specific to a single class of materials (specifically aluminum alloys in this example).

By means of the invention, having recourse to such a pre-alloyed powder by means of these techniques, derived directly from atomization, makes it possible specifically to be sure of obtaining a chemical composition within each particle and among all of the particles that is homogeneous.

Thus, it is possible to make a part that is very close to the design dimensions of the final part, and that presents properties of strength and also resistance to oxidation or to corrosion that correspond to the levels expected for the application for which the part is intended.

As a result, it follows that it is no longer always necessary to call on subsequent homogenizing heat treatments (i.e. treatments at high temperature), thereby achieving substantial savings and avoiding the part becoming distorted. Furthermore, insofar as the materials with structural hardening are quenched sufficiently after these methods of melting particles by a high-energy beam, treatment for precipitating the hardening phase at low temperature (tempering) may suffice.

The solution of the invention thus makes it possible to reduce very greatly heterogeneity in the composition and in the microstructure of the material forming the part obtained by the additive fabrication method involving melting powder particles by means of a high-energy beam.

The invention can be better understood and its advantages appear more clearly on reading the following detailed description of implementations given by way of non-limiting example. The description refers to the accompanying drawings, in which.

In order to overcome certain drawbacks of additive fabrication methods using structural materials by melting powder particles, such as for example a highly volatile chemical element evaporating from the pool, a microstructure that is unsuitable for the part because of the size and/or the morphology of its phases and/or grains, marked anisotropy of the material, the presence of unwanted brittle oxides or precipitates, the presence of defects, . . . , it is appropriate in one of the methods of synthesizing granular materials described in the invention to take into consideration a single component pre-alloyed powder or a multi-component composite powder resulting from mixing and agglomerating powders, leading to a mean composition that is different from that commonly used for the alloy from which the part is made, while conserving as well as possible a powder or a mixture of powders presenting morphology that is spherical.

In a first implementation of the invention, the powder used presents a composition that is enriched in at least one chemical element of the composition of said material forming the part that results from said method.

This consists in adding to the composition of the parent alloy a sufficient quantity of powder of one or more elements forming part of the composition of said material for forming the final part, with this being done to compensate a natural loss of a fraction of these elements while performing the additive fabrication method by melting powder particles by means of a high-energy beam. In this specific example, the powder is a single-component pre-alloyed powder of homogeneous composition.

Under such circumstances, consideration is given to the powder having a mean chemical composition that is slightly different from that of the material, in particular the metal alloy, of the part that is obtained by the method of the invention, since it is necessary to compensate for the loss of a quantity of one or more chemical elements during fabrication, in particular because of evaporation. This evaporation occurs more particularly when using an additive fabrication method in a vacuum, in particular involving electron beam melting (EBM) in contrast to the SLM method where the fabrication enclosure is generally placed at a pressure above atmospheric.

This natural loss may be the result of very considerable evaporation of these elements, after the powder particles have been raised to very high temperatures, well above their melting temperature and/or in a high vacuum ($10^{-5}$ millibars (mbar) to $10^{-6}$ mbar).

In this first variant of the first implementation, said chemical element, or one of its oxides, is volatile at the temperature produced by said high-energy beam.

When the quantity of the volatile chemical element that is lost under the effect of a high-energy beam remains low, this drawback is usually overcome by using a single-component pre-alloyed powder of composition that is homogeneous (powder of FIG. 6A) and enriched in said volatile element. If evaporation of greater amplitude is going to occur, and when no single-component pre-alloyed powder of homogeneous composition is industrially available as a result of present technical limitations, it is appropriate to consider a single-component pre-alloyed powder of composition that is heterogeneous as a result of covering (powders of FIGS. 6B and 6G) or of encrusting fine powder particles (powders of FIGS. 6C and 6H) of the composition constituted by the chemical element that is volatile.

For example, said material may be the Ti6Al4V metal alloy and said volatile element may be aluminum. The Ti6Al4V or TA6V alloy is made up of titanium, 6 weight percent (wt %) aluminum and 4 wt % of vanadium.

It is preferable to consider enriching the powder with aluminum in the range 0.15 wt % to 3 wt % relative to the composition of the Ti6Al4V alloy, and preferably in the range 0.15 wt % to 1.5 wt %.

In another example, said material is a metal alloy based on aluminum and lithium (in particular alloys having the following composition by weight: 2.7%<Cu<4.3%-0.8%<Li<1.6%-0.25%<Ag<0.45%-0.01%<Mn<0.45%-0.3%<Mg<0.8%-Zn<0.63%-Si<0.12%-Fe<0.15%, the balance being Al) and said volatile element is lithium, where the quantity that is evaporated may be as much as 0.1 wt % to 0.5 wt %.

In another example, said material is a metal alloy based on titanium, and is preferably the 6242 alloy (i.e. Ti-6Al-2Sn-4Zr-2Mo-0.1Si in weight percent), and said volatile element that needs to be enriched is Sn, with this enrichment lying in the range 0.15 wt % to 1.5 wt % relative to the composition of the alloy.

In another example, said material is an aluminum-based metal alloy, preferably the 6061 alloy in which the main alloying elements are Mg and Si, and said volatile element that needs to be enriched is Mg and/or Cu, the enrichment lying in the range 0.05 wt % to 0.40 wt % relative to the composition of the alloy for Cu and in the range 0.05 wt % to 1 wt % for Mg.

In another example, said material is an intermetallic material of TiAl type, preferably the 48-2-2 TiAl material (i.e. Ti-48Al-2Cr-2Nb in atomic percent (at %)), and said volatile element that needs to be enriched is Al, this enrichment lying in the range 0.15 wt % to 3 wt % relative to the composition of the intermetallic material.

In another example, said material is a nickel-based metal alloy of the precipitation hardening type, $\gamma'$-Ni$_3$(Al,Ti), and said volatile element that needs to be enriched is Al, the enrichment lying in the range 0.05 wt % to 3 wt % relative to the composition of the alloy.

In another example, said material is an iron-based metal alloy and more precisely a martensitic stainless steel with structural hardening by Cu, and preferably the 17-4PH (Z6CNU17-04 or X5CrNiCuNb17-4 or 1.4542) alloy having the following composition by weight: C 0.07% max; Mn 1.00% max; P 0.040% max; S 0.03% max; Si 1.00% max; Cr in the range 15.00% to 17.00%; Ni in the range 3.00% to 5.00%; Cu in the range 2.8% to 5.00%; Nb+Ta in the range 0.15% to 0.45% with the balance being Fe; and said volatile element that needs to be enriched is Cu with the enrichment lying in the range 0.15 wt % to 3 wt % relative to the composition of the alloy.

In another example, mention may be made of the 15-5 PH alloy which is a precipitation hardened martensitic stainless steel (Z7CNU15-05 or X5CrNiCuNb15-5 or 1.4540) having the following composition in weight percent: C 0.07% max; Mn 1.00% max; P 0.040% max; S 0.03% max; Si 1.00% max; Cr in the range 14.00% to 15.50%; Ni in the range 3.50% to 5.50%; Cu in the range 2.50% to 4.50%; Nb+Ta in the range 0.15% to 0.45%, and the balance being Fe. Enrichment in Cu (total quantity lying in the range 1500 ppm to 2.5 wt %), of this element that volatizes under a high-energy beam is to be considered in order to maintain the desired volume fraction for the hardening phases, which fraction is strongly associated with the content of Cu. However, given that the 15-5 PH alloy is obtained by a liquid method, it is sensitive to the notch effect as a result of certain grain boundaries being enriched in Cu and forming "troughs" in the surface of the material and thus possessing high tolerance to defects, it is usually more appropriate to avoid compensating for the loss of Cu if the precipitation hardening of the laser fabricated part is sufficient for the application under consideration.

Another example concerns the RZ5 magnesium alloy known as GZ4TR in the French AFNOR standard and as ZE41 (or Mg—Zn—RE-Zr) in the ASTM standard. Its composition by weight is as follows: Cu<0.10%; Mn<0.15%; Ni<0.01%; Zn in the range 3.50% to 5.00%; Zr in the range 0.40% to 1.00%; Ce (rare earth) in the range 0.75% to 1.75%, with the balance being Mg.

It is possible to add zinc to this RZ5 magnesium alloy, where zinc is a volatile element and the quantity that evaporates may be as much as 0.5 wt % to 2.5 wt %.

In a second implementation of the invention, the composition of the powder used presents at least one additional chemical element at a reasonable quantity (non-zero, in particular greater than 0.001 wt %, i.e. 10 ppm or indeed 10 milligrams per kilogram (mg/kg), but less than 0.5 wt %, i.e. 5000 ppm or 5 grams per kilogram (g/kg)) and suitable for modifying the microstructure of said material of the part resulting from said method compared with the situation in which the additional chemical element is absent from the composition of the powder.

Where possible, this is performed by using a single-component pre-alloyed powder of homogeneous composition (powder of FIG. 6A), that is enriched with said element. Sometimes, it is appropriate to consider a single-component pre-alloyed powder of heterogeneous composition obtained by means of a covering (powders of FIGS. 6B and 6G) or by encrustation of fine powder particles (powders of FIGS. 6C and 6H), of composition constituted by said added element. Insofar as the additions are not very ductile, compared with the single-component pre-alloyed powder, it is preferred to perform mixing-milling of the single-component powder with fine hard particles (powders of FIGS. 6E and 6F), of composition that is constituted by said added element.

Furthermore, account must be taken of the fact that too great a content of modifying elements reduces the fluidity of the pool and increases the dissolved hydrogen content in the pool, which leads to pores of occluded gas on solidification.

Under such circumstances, the element is not necessary as an element forming part of the composition of the desired parent alloy, but that is present solely for the purpose of modifying the microstructure of the material and in particular of the metal alloy of the final part so as to satisfy specifications, while overcoming certain specific features of the method, in particular microstructural anisotropy and grains of large size.

In a first variant of the second implementation, said material is a metal alloy and said additional chemical element is suitable for modifying the morphology of the metallurgical phase(s) of said metal alloy.

By way of example, for hypo-eutectic Al—Si aluminum alloys, the additional chemical elements are sodium (Na) and/or strontium (Sr) and/or calcium (Ca) and/or antimony (Sb), which have the effect of refining the morphology of the lamellar or rod eutectic. It should be mentioned that the effect of refining the eutectic microstructure, which increases the ductility of the alloy, is reduced by adding the element phosphorus (P), which reacts with the modifying elements, in particular with sodium, to form phosphides. Thus, the phosphorus content must be kept to a low level (<15 ppm to <30 ppm). It should be recalled that another way of refining the eutectic microstructure is to use method parameters that enable a high speed of solidification to be obtained, which is already a characteristic of these methods of rapid fabrication by melting powder particles by means of a high-energy beam.

In a second variant of the second implementation, said material is a metal alloy and said additional chemical element is suitable for refining the size of the grains of said metal alloy without always modifying the morphology of the grains: the idea is to refine grain size by adding an inoculant.

For example, it is well known with aluminum alloys that the fine-grain equiaxial structure provides the best combination of strength and ductility. The morphology and the size of the grains that are formed after the pool has solidified are determined by the composition of the alloy, the speed of solidification, and the addition of small quantities of additional chemical elements referred to as "refiners", in particular titanium and boron in the form of salts of Ti, of B, or of Ti—B, or indeed of Al—Ti, Al—B, or Al—Ti—B alloys. On coming into contact with liquid aluminum, these refining chemical elements form high melting point intermetallic compounds that constitute heterogeneous grain nucleation sites, thereby increasing the number of grains. Other inocculants such as Nb, Zr, and Cu—P (where the element phosphorus acts in particular on the nucleation of Si) can also be used for refining aluminum alloys. Adding a small quantity (10 ppm to 5000 ppm) of Ti and/or of Zr in aluminum alloys leads to $TiAl_3$ and $ZrAl_3$ intermetallic compounds being formed, and reduces hot cracking during solidification of these aluminum alloys by refining their grains.

By way of example, said parent metal alloy is an aluminum-based base of AlSi10Mg type similar to the 43000 alloy of the NF EN 1706 standard or indeed similar to the A360 alloy of the US Aluminum Association. This alloy is made up of aluminum, 9.5 wt % silicon, 0.5 wt % magnesium, and 1.3 wt % iron, and said element is titanium and/or boron and/or zirconium (preferably 100 ppm to 300 ppm Ti, and/or 20 ppm to 50 ppm B, and/or 100 ppm to 500 ppm Zr).

These three elements may be introduced into the parent alloy in the form of an Al—Ti or Al—Ar binary alloy containing 3 wt % to 10 wt % of Ti or of Zr, or indeed in the form of an Al—Ti—B or Al—Zr—B ternary alloy constituted by the same Al—Ti or Al—Zr binary alloy with in addition 0.2 wt % to 1 wt % of B. Direct introduction of particles of $TiB_2$ or of $ZrB_2$ into the aluminum-rich parent alloy needs to be avoided because of their high melting point making it difficult for them to dissolve, with this applying more particularly since the particles are large. Furthermore, as a result of introducing these alloys into the aluminum alloy, aluminides (essentially $TiAl_3$ or $ZrAl_3$) and borides (essentially $TiB_2$ or $ZrB_2$ and sometimes $AlB_2$) form with size, morphology, and distribution suitable for constituting heterogeneous nucleation sites for grains of aluminum.

Thus, and preferably, titanium and/or boron are two chemical elements that are introduced alone or together, preferably in the form of binary alloys (Al—Ti) or (Al—B) or ternary alloys (Al—Ti—B) of low melting point, close to that of the aluminum-based alloy.

For alloy types other than aluminum alloys, and by way of example, said parent metal alloy may be a Ti6Al4V or TA6V alloy based on titanium and said additional chemical element or refiner element may be boron (10 ppm to 5000 ppm of B) or borides of the $TiB_2$ type (10 ppm to 5000 ppm of $TiB_2$).

These chemical elements (B or $TiB_2$) are preferably introduced in the form of fine individual particles by encrustation (a discontinuous covering as in FIG. 6C) and/or by mixing (as shown in FIG. 6E).

The above-mentioned RZ5 magnesium alloy may have added thereto either Ca and/or Zr in small quantity (total lying in the range 10 ppm to 5000 ppm), thereby having a beneficial effect on grain refining.

In other examples, for alloys based on Ti, Fe, Al, or Ni, the enrichment with "refiner" additional chemical elements comprises one or more of the chemical elements selected from C, B, N, TiC, TiN, $TiB_2$, $Fe_3C$, and FeSi, with the total addition lying in the range 50 ppm to 5000 ppm.

In a third variant of the second implementation, said element is suitable for deoxidizing the pool of said metal alloy.

By way of example, said metal alloy is an iron-based alloy which is preferably 16NCD13, 32CDV13, or 15CDV6, and said additional chemical element or deoxidizing element is titanium introduced in the form of particles of TiC and/or $TiB_2$ (less than 1% vol, preferably 50 ppm to 5000 ppm of TiC and/or $TiB_2$, and preferably 50 ppm to 500 ppm of TiC and/or $TiB_2$).

In other examples, adding rare earths when synthesizing metal matrix composites (MMCs), or oxygen-hungry materials, has the effect of limiting the oxygen dissolved in the liquid pool during additive fabrication. The rare earths that are used most often are scandium (Sc), neodymium (Nd), yttrium (Y), and lanthanum (La). They have the particular feature of fixing dissolved oxygen in the form of oxides, which oxides are chemically stable relative to the matrix of the MMC and of oxygen-hungry materials. In order to reduce costs and in order to deoxidize the liquid pool more effectively, it is usually appropriate to introduce the rare earths into the synthesis of the powders in the form of small-sized hexaborides of the $RB_6$ ($NdB_6$, $YB_6$, $LaB_6$, $ScB_6$) type, which are suitable for forming (refiner) borides as well as for trapping the oxygen that is dissolved in the liquid pool by forming oxides.

Thus, and preferably, said additional chemical element is added by adding fine particles of TiC, $TiB_2$, and/or hexaborides of rare earths for alloys that are based on Ti, Fe, and Al.

In another example, the above-mentioned RZ5 magnesium alloy may be enriched with 50 ppm to 5000 ppm of rare earths that act not only to deoxidize the pool, but that also serve to increase resistance to galvanic corrosion and make it possible to reduce micropores and cracking when the liquid pool solidifies.

In a fourth variant of the second implementation, relating to particles of a composite powder having reinforcement, which is preferably discontinuous and in slender form (fibers) or equiaxial form (particles), (powder of FIG. 6I), said additional chemical element (surfactant or wetting agent) is suitable for improving wetting of the (discontinuous) reinforcement by the liquid formed by melting a portion of the composite powder particles by means of a high-energy beam: in particular this involves the high-energy beam melting other metallic individual particles of the composite powder.

For example, in composites having an aluminum-based matrix reinforced with particles of SiC, dissolving the element Mg therein increases the wetting of SiC by liquid aluminum, whereas dissolving the element Cu reduces wetting.

Adding a small quantity (50 ppm to 5000 ppm) of Si makes it possible to control the Fe content of the aluminum-rich liquid pool and to reduce its melting temperature a little, thereby improving wettability between the liquid and the SiC reinforcement.

It is found that with the elements Cu and Si (total quantity lying in the range 50 ppm to 5000 ppm), the same effect occurs concerning the wettability of SiC reinforcement in magnesium alloys.

In a fifth variant of the second implementation, said element is suitable for improving the absorptivity of the radiation delivered by the high-energy beam so as to make it easier firstly to perform densification by sintering if the powder bed is sufficiently compact (when performing the SLS method), or secondly to melt the powders of the material in question (when performing the SLM or DMD methods).

For example, said material is a ceramic that is practically transparent to the radiation of the high-energy beam, preferably being oxides ($Al_2O_3$, $SiO_2$, $ZrO_2$, $Y_2O_3$, MgO, $TiO_2$, . . . ), or mixtures of a plurality of oxides ($Al_2O_3$—$SiO_2$, $Al_2O_3$—$ZrO_2$, $Al_2O_3$—$Y_2O_3$, $Al_2O_3$—$SiO_2$—$Y_2O_3$, . . . ), some of which may act as a flux (lowering the solidus temperature of the mixture by forming a small quantity of low melting point liquid that facilitates densification and consolidation of the material during additive fabrication), and said element is carbon—or any other element that absorbs the wavelength of the laser being used—that is preferably introduced in the form of a continuous covering (50 ppm to 5000 ppm of carbon or a carbon derivative, and preferably 100 ppm to 1000 ppm of carbon) of an atomized or centrifuged powder (powder of FIG. 6B) or indeed of a powder that is agglomerated and then densified (a powder like that shown in FIG. 6J, but that has also been covered after being flame or oven densified in order to eliminate the binder completely).

In a sixth variant of the second implementation, said additional chemical compound or element is suitable for reinforcing the metal alloy from a mechanical point of view for a high temperature application: in particular, said additional chemical compound is used at a volume fraction that is sufficiently large, lying in the range 3% vol to 30% vol, and of a size that is sufficiently fine with a distribution that is sufficiently homogeneous, both close to the size and distribution of the metallic individual particles of the composite powder shown in FIG. 6J.

For 16NCD13, 32CDV13, 15CDV6, . . . steels, the compounds FeAl, TiC and many others, can act as reinforcement. The specific strength of metal matrix composites (MMCs) and their high temperature behavior are necessarily improved compared with materials that have not been reinforced. Nevertheless, their ductility is reduced, which requires the volume fraction of the reinforcement to be optimized so as to limit this drop in ductility.

In another example, titanium alloys such as TA6V, for example, may be reinforced with added TiB and/or TiC, the reinforcement being at a volume fraction that preferably does not exceed 15% vol. These additions may be obtained by causing the titanium alloy to react with the $B_4C$ reinforcement.

It has been envisaged to incorporate SiC reinforcement in aluminum alloys of the 5000 series and $Al_2O_3$ reinforcement in aluminum alloys of the 6000 series. It is also possible to envisage introducing SiC reinforcement in magnesium alloys.

The invention claimed is:

1. A method of fabricating a part out of a material with discontinuous reinforcement, the method comprising:
   melting or sintering powder particles of the material with discontinuous reinforcement via a high-energy beam,
   wherein
   the material is a metallic, intermetallic, ceramic, ceramic matrix composite, or a metal matrix composite material,
   the powder particles have substantially identical mean composition, a sphericity of from 0.8 to 1.0, a form factor of from 1 to $\sqrt{2}$, and a grain size distribution narrowed around a mean diameter value $d_{50\%}$ in such a manner that:

$(d_{90\%}-d_{50\%})/d_{50\%} \leq 0.66$, $(d_{50\%}-d_{10\%})/d_{50\%} \leq 0.33$, and $(d_{90\%}-d_{10\%})/d_{50\%} \leq 1.00$, the composition of the powder particles comprises an additional chemical element in a quantity of more than 0 and less than 0.5 wt % and suitable for modifying the material's microstructure,
   and
   the additional chemical element facilitates wetting of the reinforcement by a liquid, which is formed by melting a portion of the powder particles via the high-energy beam.

2. The method according to claim 1,
   wherein a span value defined as:

$(d_{90\%}-d_{10\%})/d_{50\%}$ is less than or equal to 0.50, with:

$(d_{90\%}-d_{50\%})/d_{50\%} \leq 0.33$, and $(d_{50\%}-d_{10\%})/d_{50\%} \leq 0.17$.

3. The method according to claim 1,
   wherein the powder particles are obtained by atomizing or centrifuging a parent alloy.

4. The method according to claim 1,
   wherein the powder particles are obtained by coating or by encrustation.

5. The method according to claim 1,
   wherein the powder particles are obtained by milling/mixing.

6. The method according to claim 1,
wherein the powder particles are obtained by granulating a suspension.

7. The method according to claim 1,
wherein the composition of the powder particles is enriched in at least one chemical element, which is a chemical element of the material.

8. The method according to claim 7,
wherein the at least one chemical element, or an oxide of the at least one chemical element, is volatile at a temperature produced by the high-energy beam.

9. The method according to claim 8,
wherein the material is a Ti6Al4V metal alloy and the volatile chemical element is aluminum.

10. The method according to claim 9,
wherein an enriched content of aluminum from the powder particles ranges from 0.15 wt % to 3 wt % relative to the Ti6Al4V alloy.

11. The method according to claim 8, wherein the material is a metal alloy based on aluminum or on lithium, and the volatile chemical element is lithium.

12. The method according to claim 1,
wherein the high-energy beam is a laser beam.

13. The method according to claim 12,
wherein the melting or sintering comprises applying a direct metal deposition technique, a selective laser melting technique, or a selective laser sintering technique to a powder bed.

14. A method of fabricating a part out of a material with discontinuous reinforcement, the method comprising:
melting or sintering powder particles via a high-energy beam,
wherein
the material is a metallic, intermetallic, ceramic, ceramic matrix composite, or a metal matrix composite material,
the powder particles have substantially identical mean composition, a sphericity of from 0.8 to 1.0, a form factor of from 1 to $\sqrt{2}$, and a grain size distribution narrowed around a mean diameter value $d_{50\%}$ in such a manner that:

$(d_{90\%}-d_{50\%})/d_{50\%} \leq 0.66$, $(d_{50\%}-d_{10\%})/d_{50\%} \leq 0.33$, and $(d_{90\%}-d_{10\%})/d_{50\%} \leq 1.00$, the composition of the powder particles comprises an additional chemical element in a quantity of more than 0 and less than 0.5 w % and suitable for modifying the material's microstructure, and
when the material is a ceramic material, the additional chemical element is suitable for improving the ceramic material's absorptivity of a radiation emitted by the high-energy beam.

* * * * *